United States Patent
Yu et al.

(10) Patent No.: US 9,084,131 B2
(45) Date of Patent: Jul. 14, 2015

(54) DATA CUT-OVER METHOD AND APPARATUS

(75) Inventors: Jia Yu, Shenzhen (CN); Jiawang Hu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 332 days.

(21) Appl. No.: 13/642,990

(22) PCT Filed: Apr. 13, 2011

(86) PCT No.: PCT/CN2011/072753
§ 371 (c)(1),
(2), (4) Date: Oct. 23, 2012

(87) PCT Pub. No.: WO2011/131101
PCT Pub. Date: Oct. 27, 2011

(65) Prior Publication Data
US 2013/0040627 A1  Feb. 14, 2013

(30) Foreign Application Priority Data
Apr. 23, 2010  (CN) .......................... 2010 1 0165065

(51) Int. Cl.
*H04M 3/00* (2006.01)
*H04W 4/00* (2009.01)
*H04W 24/00* (2009.01)
*H04M 1/00* (2006.01)
*H04B 1/38* (2006.01)
*H04W 24/02* (2009.01)
*H04L 12/24* (2006.01)

(52) U.S. Cl.
CPC ............. *H04W 24/02* (2013.01); *H04L 41/145* (2013.01)

(58) Field of Classification Search
CPC ..... H04W 8/245; H04W 24/00; H04W 24/08; H04M 1/72525; H04L 63/08; H04L 63/0823
USPC ............ 455/423–424, 561, 418, 422.1, 550.1
See application file for complete search history.

(56) References Cited

U.S. PATENT DOCUMENTS 5,873,035 A * 2/1999 Ladden et al. ................ 455/436
2004/0172592 A1* 9/2004 Collie et al. .................. 715/503
(Continued)

FOREIGN PATENT DOCUMENTS

CN  101426220 A  5/2009
CN  101448273 A  6/2009
(Continued)

OTHER PUBLICATIONS

P.R. China, State Intellectual Property Office, International Search Report for International Application No. PCT/CN2011/072753, mailed Jul. 21, 2011.

*Primary Examiner* — Dung Hong
(74) *Attorney, Agent, or Firm* — Bright IP Law Offices

(57) ABSTRACT

The present invention discloses a data cut-over method and apparatus, wherein the method includes: obtaining a model mapping relationship between a source Operation Maintenance Module (OMM) and a target OMM of different system versions (S101); obtaining a base station which is designated by a user to be cut over to the target OMM and data associated with the base station that needs to be modified during the data cut-over designated by the user, and generating a data cut-over plan file (S102); exporting a source OMM data file from the source OMM (S103); exporting a target OMM data file from the target OMM (S104); generating an interface data file according to the model mapping relationship, the source OMM data file, the target OMM data file and the data cut-over plan file (S105); and importing the interface data file into the target OMM (S106). The present invention improves the cut-over efficiency and accuracy and reduces the cut-over workload.

14 Claims, 4 Drawing Sheets

(56) References Cited

U.S. PATENT DOCUMENTS

| | | |
|---|---|---|
| 2006/0178898 A1* | 8/2006 | Habibi .............................. 705/1 |
| 2007/0097939 A1* | 5/2007 | Nylander et al. ............. 370/338 |
| 2007/0100897 A1 | 5/2007 | Kelly et al. |
| 2010/0274813 A1* | 10/2010 | Lu et al. ........................ 707/792 |

FOREIGN PATENT DOCUMENTS

| | | |
|---|---|---|
| CN | 101594706 A | 12/2009 |
| CN | 101860842 A | 10/2010 |

* cited by examiner

DATA CUT-OVER METHOD AND APPARATUS

CROSS REFERENCE TO RELATED APPLICATIONS

This application is the U.S. National Stage of International Patent Application No. PCT/CN2011/072753 filed on Apr. 13, 2011, which claims priority to Chinese Patent Application No. 201010165065.3 filed on Apr. 23, 2010. Both the PCT Application and Chinese Application are hereby incorporated by reference in their entirety.

FIELD OF THE INVENTION

The present invention relates to the communication field, and in particularly to a data cut-over method and apparatus.

BACKGROUND OF THE INVENTION

Usually, a base station under an Operation Maintenance Module (OMM) needs to be cut over to another OMM based on requirements of service changes during an operation and maintenance process of a wireless communication device.

Generally, a communication network operator uses products of more than one communication device suppliers at the same time, and old communication device suppliers are replaced by new device suppliers with in a cut-throat wireless communication market. During this process, because of significant differences in system architectures and Management Object Classes (MOC) between OMM systems of old communication deices and those of new communication devices, new communication device suppliers must consider cutting over base station data under old OMMs to new OMMs rapidly and effectively while ensuring that services will not change significantly before and after cut-over and avoiding influence on network performance and quality.

Generally, base station data cut-over is performed according to the following two methods in related technologies:

the first method is manual base station data cut-over, i.e. according to data configuration of a base station on a source OMM, a set of identical base station data is configured on a target OMM manually.

The first method can realize cut-over for a base station between OMMs of the same system or different systems, but results in a very low efficiency and high error probability due to manual operation.

The second method is to upgrade an OMM of a version to ensure a consistent version liar a source OMM and a target OMM and perform cut-over using an existing cut-over method and apparatus subsequently, thus solving the problems of efficiency and accuracy during data cut-over of the same version. However, the data cut-over methods above have the following problems:

(1) although data cut-over may be realized by the first method for a source OMM system and a target OMM system of different versions, the first method can be achieved only by a primitive manual cut-over way. According to base station data on a source OMM, identical or similar base station data is established on a target OMM manually, which brings about a huge workload because of a huge data volume of a base station which needs to be cut over. There are hundreds of Management Objects (MO) and thousands of parameters on each base station, which results in a huge workload when operated manually, thus failing to ensure the efficiency and quality.

(2) the second method can avoid low manual cm-over efficiency of manual cut-over and ensure data accuracy on the condition that the version of a source OMM supports upgrading to the version of a target OMM. Therefore, the second method has a disadvantage that base station cut-over can be performed only between OMMs of the same system version and cut-over is not supported between OMMs of different system versions.

In most cases, however, cut-over or upgrading cannot be performed directly because of significant differences in system architectures and MOCs of different versions. Therefore, OMMs based on different system architectures, especially OMMs of different device suppliers cannot be upgraded to each other. In addition, even if base station cut-over is performed between OMMs of the same device supplier, a source OMM and a target OMM ma be different in version, users and service personnel need to upgrade the OMM with a relatively to version before performing base station cut-over using an existing cut-over tool. However version upgrading is highly dangerous and a system breakdown may be caused by an improper operation, which greatly restricts the application scenarios of the existing data cut-over methods and apparatuses.

SUMMARY OF THE INVENTION

The present invention provides a data cut-over method and apparatus to solve at least one of the problems above.

According to an aspect of the present invention, a data cut-over method is provided, including: obtaining a model mapping relationship between a source OMM and a target OMM of different system versions; obtaining a base station which is designated by a user to be cut over to the target OMM and data associated with the base station that needs to be modified during the data cut-over designated by the user, and generating a data cut-over plan file: exporting a source OMM data file from the source OMM; exporting a target OMM data file horn the target OMM; generating an interface data file according to the model mapping relationship, the source OMM data file, the target OMM data file and the data cut-over plan file: and importing the interface data file into the target OMM.

The data associated with the base station that needs to be modified during the data cut-over designated by the user includes at least one of the followings: a base station identifier (ID), a base station alias, a base station port and a Base Station Controller (BSC) port.

The process of generating an interface data file according to the model mapping relationship, the source OMM data file, the target OMM data file and the data cut-over plan file includes: according to the model mapping relationship, determining whether there is a corresponding relationship between an MOC and associated source MOC attributes of the source OMM and an MOC and associated target MOC attributes of the target OMM; if the MOC and the source MOC attributes of the source OMM correspond to the MOC and the target MOC attributes of the target OMM, adapting the MOC and the source MOC attributes of the source OMM to be the MOC and the target MOC attributes of the target OMM according to the model mapping relationship and storing the MOC and the MOC target attributes in an interface data file; if the MOC and the source MOC attributes of the source OMM do not correspond to the MOC and the target MOC attributes of the target OMM, discarding the MOC and the source MOC attributes that exist only in the source OMM; and if the MOC and the source MOC attributes of the source OMM do not correspond to the MOC and the target MOC attributes of the target OMM, storing default values of the MOC and the target MOC attributes that exist only in the target OMM in the interface data file.

After generating a data cut-over plan file, the method further includes: performing validity inspection for the data cut-over plan file and returning error information if the inspection result is invalid.

The mapping relationship, the source OMM data file, the target OMM data file, the data cut-over plan file and the interface data file are described in Excel format or Extensible Markup Language (XML) format.

According to another aspect of the present invention, a data cut-over apparatus is provided, including: a first obtaining module configured to obtain a model mapping relationship between a source OMM and a target OMM of different system versions; a second obtaining module, configured to obtain a base station which is designated by a user to be cut over to the target OMM and data associated with the base station that needs to be modified during the data cut-over designated by the user; a first generating module, configured to generate a data cut-over plan file; a first exporting module, configured to export a source OMM data file from the source OMM, second exporting module, configured to export a target OMM data file from the target OMM; a second generating module, configured to generate an interface data file according to the model mapping, relationship, the source OMM data file, the target OMM data file and the data cut-over plan file; and an importing module, configured to import the interface data file into the target OMM.

The second generating module further includes: a determining module, configured to, according to the model mapping relationship, determine whether there is a corresponding, relationship between an MOC and associated source MOC attributes of the source OMM and an MOC and associated target MOC attributes of the target OMM; a first storing module, configured to, if the MOC and the source MOC attributes of the source OMM correspond to the MOC and the target MOC attributes of the target OMM, adapt the MOC and the source MOC attributes of the source OMM to be the MOC and the target. MOC attributes of the target OMM according to the model mapping relationship and store the MOC and the MOC target attributes in an interface data file; a processing module configured to, if the MOC and the source MOC attributes of the source OMM do not correspond to the MOC and the target MOC attributes of the target OMM, discard the MOC and the source MOC attributes that exist only in the source OMM; a second storing module configured to, if the MOC and the source MOC attributes of the source OMM do not correspond to the MOC and the target MOC attributes of the target OMM, store default values of the MOC and the target MOC attributes that exist only in the target OMM in the interface data file.

Preferably, the apparatus further comprises: a validity inspecting module configured to perform validity inspection for the data cut-over plan file.

Further, the mapping relationship, the source OMM data file the target OMM data file, the data cut-over plan file and the interface data file are described in Excel format, or XML format.

By virtue of the present invention, an interface data file is generated using a model mapping relationship, a source OMM and a target OMM to perform data cut-over, thus solving the problem of cut-over between OMMs of different system versions to further expand application scenarios of base station cut-over and improve engineering efficiency.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention will be described in details below with reference to the accompanying drawings and in combination with the embodiments. It should be noted that, if there is no conflict, the embodiments of the application and the characteristics in the embodiments can be combined with one another.

Figure 1:
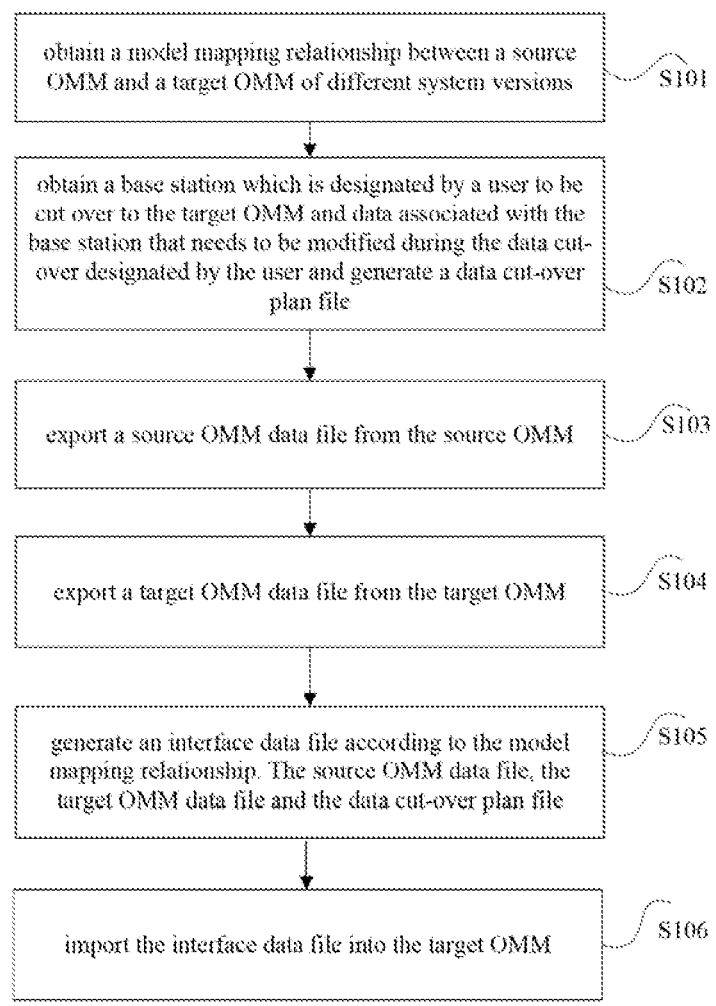
FIG. 1 is a flowchart of a data cut-over method according to an embodiment of the present invention.

The present invention provides a data cut-over method. As shown in FIG. 1, the method includes Step S101 to Step S106 as follows:

Step S101: obtain a model mapping relationship between a source OMM and a target OMM of different system versions.

Step S102: obtain a base station which is designated by a user to be cut over to the target OMM and data associated with the base station that needs to be modified daring the data cut-over designated by the user, and generate a data cut-over plan file.

Step S103; export a source OMM data file from the source OMM.

Step S104: export a target OMM data file from the target OMM.

Step S105: generate an interface data file according to the model mapping relationship, the source OMM data file, the target OMM data file and the data cut-over plan file.

Step S106: import the interface data file into the target OMM.

Preferably, in Step S101, the model mapping relationship (an MOC model mapping relationship file between the source OMM and the target OMM) defines a corresponding relationship between an MOC as well as attributes thereof of the source OMM and an MOC well as attributes thereof of the target OMM, i.e., the file is configured to describe information model difference between the source OMM and the target OMM.

Preferably, the data associated with the base station that needs to be modified during the data cut-over designated by the user includes at least one of the followings: a base station ID, a base station alias, a base station port and a BSC port.

Preferably. Step S105 includes: according to the model mapping relationship, determine whether there is a corresponding relationship between an MOC and associated source MOC attributes of the source OMM and an MOC and associated target MOC attributes of the target OMM; if the MOC and the source MOC attributes of the source OMM correspond to the MOC and the target MOC attributes of the target OMM, adapt the MOC and the source MOC attributes of the source OMM to be the MOC and the target MOC attributes of the target OMM according to the model mapping relationship and store the MOC and the MOC target attributes in an interface data file: if the MOC and the source MOC attributes of the source OMM do not correspond to the MOC and the target MOC attributes of the target OMM, discard the MOC and the source MOC attributes that exist only in the source OMM: and if the MOC and the source MOC attributes of the source OMM do not correspond to the MOC and the target MOC attributes of the target OMM, store default values of the MOC and the target MOC attributes that exist only in the target OMM in the interface data file.

Preferably, after generating a data cut-over plan file, the method further includes: perform validity inspection for the data cut-over plan file and return error information if the inspection result is invalid.

Preferably, the mapping relationship, the source OMM data file, the target OMM data file, the data cut-over plan file and the interface data file are described in Excel format or XML to mat.

Preferably, in Step S105, the interface data file is generated using a base station physical data processing strategy and a base station wireless data processing strategy, wherein the base station physical data processing strategy is that: physical data mainly involves changes of the base station ID and the base station alias, and change of the connection relationship between the base station port and the BSC port etc. when the base station in the source OMM is cut over to the target OMM. This part of information is designated by the user in the data cut-over plan file. According to the MOC model mapping relationship between the source OMM and the target OMM, the base station physical data of the source OMM is adapted to be the base station physical data of the target OMM. During the adaptation process, part of the data is modified according to information provided by the user in the data cut-over plan file. Finally, the generated base station physical data is stored in the interface data file, wherein the base station wireless data processing strategy is that: according to the MOC model mapping relationship file between the source OMM and the target OMM, the base station wireless data of the source OMM is adapted to be the base station wireless data of the target OMM. The data is modified according to the principle as follows during the adaptation process and the generated base station wireless data is stored in the interface data file finally. A processing strategy is provided as follows for the differences between the respective MOCs and attributes of the source OMM and the target OMM:

the values of the MOCs and the attributes existing in both the source OMM and the target OMM need to be cut over to the target OMM as is. If an MOC and associated MOC attributes exist in both the source OMM and the target OMM, but with different names, it is deemed that both the source OMM and the target OMM have the MOC and the MOC attributes, which are adapted according to the model mapping relationship and cut over to the target OMM system. The process is a process for converting a source MOC and attributes into a target MOC and attributes. A simplest example is given as follows: an MOC on a source OMM is named A and an attribute of A is named a; and an MOC existing in a target OMM is named A' and an attribute of A' is named a'. Actually, A and A' are of the same object type in term of services although they have different names on the source OMM and the target OMM. There is a corresponding relationship described in a model mapping relationship file between A and A' on services. An adaptation process includes finding the a' attribute of the A' object of the target OMM, which correspond to the a attribute of the A object of the source OMM, and storing the value of a in a'. Those MOCs and associated attributes existing in the source OMM, but not in the target OMM are discarded without being processed when the source OMM is cut over to the target OMM. For those MOCs and attributes existing in the target OMM, but not in the source OMM, the attributes of these MOCs should adopt the default values of the target OMM when the source OMM is cut over to the target OMM. During a cut-over process from the source OMM to the target OMM, a user needs to designate wireless parameters over again. The wireless parameters are designated in a plan data file and modified by an offline tool according to the plan data file during the cut-over process.

It should be noted that, data configured according to a base station cut-over method among versions of an embodiment of the present invention is provided as follows:

a source OMM data file: database configuration data of a source OMM is exported into a file system by using the configuration exporting function of the source OMM and the file may be an Excel file or an XML file etc.

a target OMM data file: database configuration data of a target OMM is exported into the file system by using the configuration exporting function of the target OMM and the file may be an Excel file or an XML file etc.

a data cut-over plan file: the data cut-over plan file is provided by engineering personnel. The file describes which base stations need to be cut over from the source OMM to the target OMM and which data needs to be modified according, to an engineering plan, i.e., the file provides a data modification entry for a user and file may be an Excel file or an XML file etc.

an inter the data file: the interface data file generated for a target OMM information model adapts to the target OMM system and may be imported on the target OMM to complete cut-over. The file may be an Excel file or an XML file etc.

Preferably, the source OMM data file and the target OMM data file act as source data and the two data files may be read by an apparatus to obtain related data from the source OMM and the target OMM. The plan data file is filled in by a user, which is equivalent to providing a cut-over data modification entry for the user. The interface file is a data file which is generated by a tool automatically, capable of adapting to a target OMM information model and configured to execute importing operation at the target OMM to complete cut-over.

Figure 2:
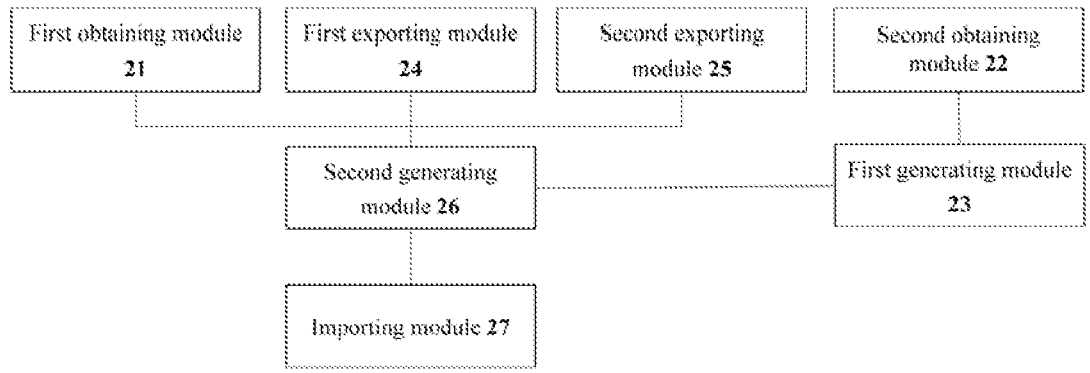
FIG. 2 is a structure diagram of a data cut-over apparatus according to an embodiment of the present invention.

The present invention provides a data cut-over apparatus. FIG. 2 is a structure diagram illustrating a data cut-over apparatus according to an embodiment of the present invention. As shown in FIG. 2, the apparatus includes a first obtaining module 21, a second obtaining module 22, a first generating module 23, a first exporting module 24, a second exporting module 25, a second generating module 26 and an importing module 27. The structure above is described below in details:

the first obtaining module 21 is configured to obtain a model mapping relationship between a source OMM and a target OMM of different system versions; the second obtaining module 22 is configured to obtain a base station which is designated by a user to be cut over to the target OMM and data associated with the base station that needs to be modified during the data cut-over designated by the user; the first generating module 23 is connected to the second obtaining module 22 and configured to generate a data cut-over plan file according to the second obtaining module 22; the first exporting module 24 is configured to export a source OMM data file from the source OMM; the second exporting module 25 is configured to export a target OMM data file from the target OMM; the second generating module 26 is connected to the first obtaining module 21, the first generating module 23, the first exporting module 24 and the second exporting module 25, and configured to generate an interface data file according to the model mapping relationship obtained by the first obtaining module 21, the source OMM data file exported by the first exporting module 24, the target OMM data file exported by the second exporting module 25 and the data cut-over plan file generated by the first generating module 23; and the importing module 27 is connected to the second generating module 26 and configured to import the interface data file generated by the second generating module 26 into the target OMM.

Figure 3:
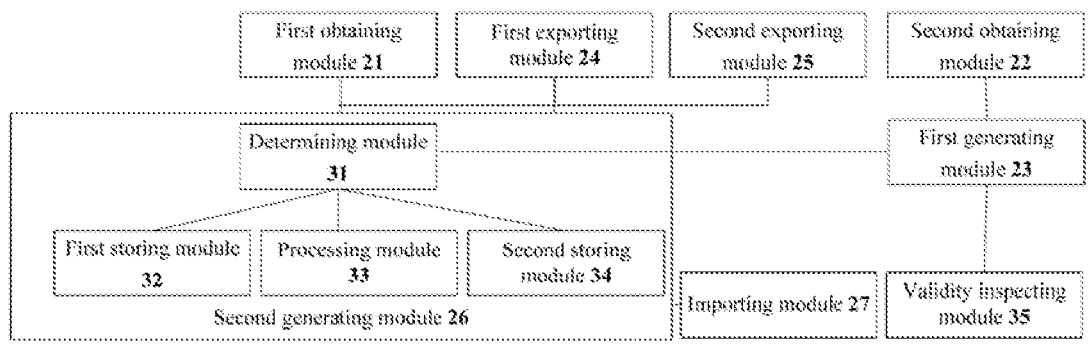
FIG. 3 is a preferred structure diagram illustrating a data cut-over apparatus according to an embodiment of the present invention.

FIG. 3 is a structure diagram illustrating a data cut-over apparatus according to an embodiment of the present invention. As shown in FIG. 3, the second generating module 26 further includes: a determining module 31, a first storing module 32, a processing module 33 and a second storing module 34. The apparatus further includes: a validity inspecting module 35. The structure above is described below in details:

the determining module 31 is configured to, according to the model mapping relationship, determine whether there is a corresponding relationship between an MOC and associated source MOC attributes of the source OMM and an MOC and associated target MOC attributes of the target OMM; the first storing module 32 is connected to the determining module 31 and configured to, if the determination result of the determining module 31 is that the MOC and the source MOC attributes of the source OMM correspond to a MOC and associated target MOC attributes of the target OMM, adapt the MOC and the source MOC attributes of the source OMM to be the MOC and the target MOC attributes of the target OMM according to the model mapping relationship and store the MOC and the MOC target attributes in an interface data file: the processing module 33 is connected to the determining module 31 and configured to, if the determination result of the determining module 31 is that the MOC and the source MOC attributes of the source OMM do not correspond to the MOC and the target MOC attributes of the target OMM, discard the MOC and the source MOC attributes that exist only in the source OMM; the second storing module 34 is connected to the determining module 31 and configured to, if the determination result of the determining module 31 is that when the MOC and the source MOC attributes of the source OMM do not correspond to the MOC and the target MOC attributes of the target OMM, store default values of the MOC and the target MOC attributes that exist only in the target OMM in the interface data file; and the validity inspecting module 35 is configured to perform validity inspection for the data cut-over plan file.

It should be noted that, MOCs and MOC attributes consistent with a target OMM information model are generated by the first: storing module 32, the processing module 33 and the second storing module 34 according to a base station physical data processing strategy and a base station wireless data processing strategy described in an embodiment of a method embodiment, and stored in the interface data file.

The validity inspecting module 35 is connected to the first generating module 23 and configured to perform validity inspection for the data cut-over plan file generated by the first generating module 23.

Figure 4:
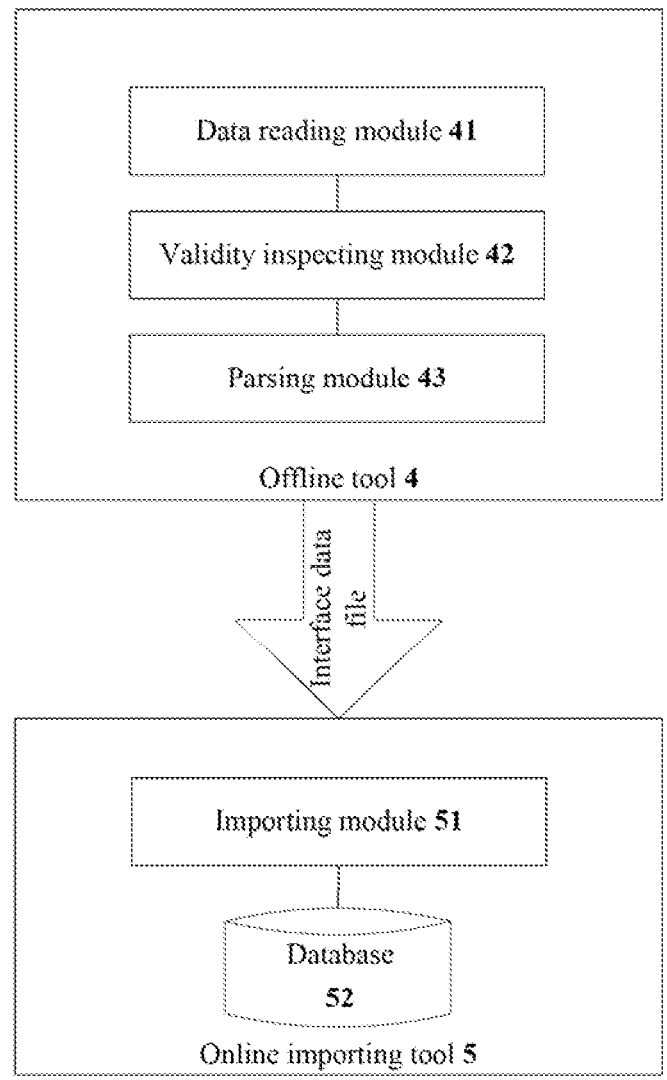
FIG. 4 is a structure diagram according to a preferred embodiment of the present invention.

FIG. 4 is a structure diagram according to a preferred embodiment of the present invention. As shown in FIG. 4, an offline tool 4 and an online importing tool 5 are included. The structure above is described below in details:

The offline tool 4, which is independent from a source OMM system and a target: OMM system and not bound with the OMM systems, is mainly configured to according to network data files exported by a source OMM and a target OMM and a plan data file inputted by a user, generate interface file data which is suitable to be imported on the target OMM, from a base station which needs to be cut over on the source OMM.

The offline tool 4 mainly includes the following modules; a data reading module 41, a validity inspecting module 42 and a parsing module 43.

The data reading module 41 is mainly configured to read a source OMM network data file, a target OMM network data file and a user plan data file, and cache the read file data in a memory to be used by the validity inspecting module 42 and the parsing module 43; the validity inspecting module 42 is connected to the data reading module 41 and mainly configured to perform data validity inspection for the content of the plan data file which is provided by the user, so as to ensure accuracy of the generated interface data file; the parsing module 43 is connected to the data reading module 41 and the validity inspecting module 42 and mainly configured to process the MOC model difference between the source OMM and the target OMM, and adapt the MOC model of the source OMM to be the MOC model of the target OMM.

Since the main problem of cut-over among versions is to solve the MOC information model difference between OMMs of different versions, the parsing module 43, according to the MOC model of the target OMM, generates the interface data file to be imported by the target OMM, i.e. information model adaptation from the source OMM to the target OMM is completed according to the model mapping relationship so as to realize station cut-over among OMM versions.

Preferably, the model mapping relationship may be predefined by the offline tool 4 or may be predefined by the user.

The online importing tool 5 includes an importing module 51 and a database 52. The structure above is described below in details:

The importing module 51 is configured to import the interface data file into the database 52 on the target OMM.

Preferably, the online importing tool 5, which is integrated on the target OMM, reads the interface data file generated by the offline tool 4 and imports the base station data in the interface data file into the target OMM system so as to realize base station cut-over among versions horn the source OMM to the target OMM.

The present invention further provides a preferred embodiment in which the technical solutions in many preferred embodiments above are combined. Detailed description is given below according to FIG. 4 and FIG. 5.

In this embodiment, taking a Global System for Mobile Communication (GSM) of ZTE Corporation for example, GSM network management of ZTE includes two major series, i.e. V2 and V3. A V2 network management system is realized by a C++ framework while a V3 network management system is realized by a Java framework. There is a significant MOC difference between the two systems and cut-over or upgrading cannot be performed directly.

Figure 5:
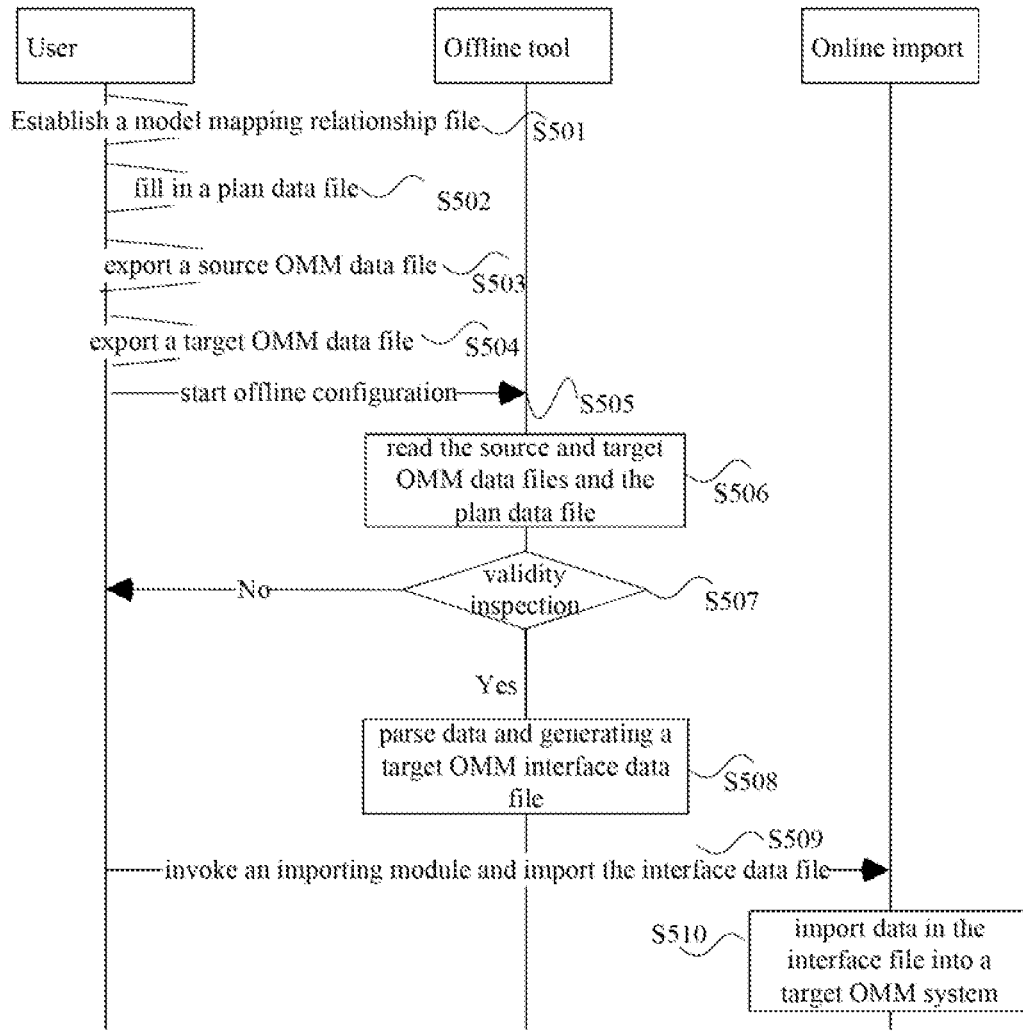
FIG. 5 is a flowchart according to a preferred embodiment the present invention.

FIG. 5 is a flowchart illustrating a data cut-over method according to a preferred embodiment of the present invention. As shown in FIG. 5, the following steps, Step S501 to Step S510, are included.

Step S501: an MOC information model mapping relationship file of a V2 system and a V3 system needs to be defined first. The file is described using XML file format in this embodiment.

For example, mapping of a base station MOC;

```
<map>
    <moc v2moc="ZTESITE" v3moc="IBTSFUNCTION">
    <field v2name="PHSITEID" v3name="SITEID"/>
    ...0.....
    ........
    </moc>
</map>
```

Preferably, the corresponding relationship described by the file may be predefined by a program, used by a user directly or user-defined. In this embodiment, the file is predefined by a program.

Step S502: the user fills in a cut-over plan data file. The plan data file is an Excel file in this embodiment. The user designates a base station which needs to be cut over from the V2 system to the V3 system and data which needs to be modified during the cut-over.

For example, a port connection relationship of the base station and a BSC after the base station in the V2 system is cut over to the V3 system, is designated in a plan data excel template.

Step S503: the user exports a V2 configuration data file from the V2 system. The file is in Excel format in this embodiment and includes configuration full data in the V2 system.

Step S504: the user exports a V3 configuration data file from the V3 system. The file is in Excel format in this embodiment and includes configuration full data in the V3 system.

Step S505: the user starts an offline tool 4, and imports the V2 configuration data Excel file. The V3 configuration data Excel file and the plan data Excel file.

Step S506: a data reading module 41 in the offline tool 4, reads the contents of the V2 configuration data Excel file, the V3 configuration data Excel file and the plan data Excel file and stores the contents in a memory to be used by a validity inspecting module and a parsing module. Of course, the user may not export the V2 and V3 configuration data files, and the data reading module 41 may be connected to databases of the V2 and V3 systems directly to obtain the configuration data. The former method is applied in this embodiment.

Step S507: the validity inspecting module 42 in the offline tool 4 performs data validity inspection for the content of the plan data file filled by the user.

For example, when a base station is cut over from a source OMM to a target OMM, the validity inspecting module 42 determines whether a port number of a target BSC designated to be connected by the base station in plan data exists. Step 508 is performed if inspection is passed. Otherwise a related error is returned to remind a user to perform modification.

Step S508: the parsing module 43 of the offline tool 4 generates an interface data file according to the V2 configuration data, V3 configuration data and plan data stored by the data reading module 41 in the memory and in combination with the MOC model mapping relationship file of the V2 and V3 systems and the above physical data processing strategy and wireless data processing strategy.

Preferably, according to each MO of the V2 system, an MOC of the V3 system corresponding to a MOC of the V2 system is founded in the MOC model mapping relationship file in Step 501 to generate an MO of the V3 system. Subsequently, each attribute of the MO of the V2 system is searched to find attributes of the V3 system corresponding to the attribute in the MOC model mapping relationship file, and then the value of the attribute of the MO of the V2 system is set into the corresponding to a MOC attribute of the V3 system. Applying the process above, a V2 MO is adapted to a V3 MO and necessary attribute values are modified according to the plan data during the adaptation process. After the adaptation is completed, the generated MO of the V3 system is stored in the interface data file.

It should be noted that, the relationship between an MOC and an MO is that: the MOC is a management object type while the MO is a management object, i.e. the MO is an example of a specific object of the MOC.

Step S509: the user invokes an importing module 51 and imports the interface data file.

Step S510: the user starts the importing module 51 on the target OMM; reads the data in the interface data Excel file and imports the data into a target OMM system, e.g. a database 52 so as to complete cut-over.

The steps above solve the shortage of extremely low efficiency caused by manually cutting over base station data of a V2 system to a V3 system. Engineering personnel may realize base station data cut-over among versions for two OMM systems of different versions simply and efficiently, i.e. the base station data in the V2 system is cut over into the V3 system and a user only needs to fill in a small amount of necessary plan data during the base station data cut-over process from the V2 system to the V3 system, Base station cut-over between a source OMM and a target OMM of different version can be completed easily to greatly accelerate project progress and improve engineering quality.

To sum up, by applying the data cut-over scheme of the present invention, base station cut-over among, versions is realized to reduce much inconvenience and great pressure confronted by the base station cut-overwork at a project site. Users and service personnel only need to input a small amount of necessary data to realize the base station cut-over work among system versions easily, so as to greatly expand application scenarios of a base station cat-over apparatus and improve engineering efficiency.

It should be noted that, the data cut-over apparatuses described in the apparatus embodiments correspond to the method embodiments above. The specific implementation processes of the data cut-over apparatuses have been described in the method embodiments. Which will not be repeated here.

Obviously, those skilled. In the art should understand that the modules or steps of the present invention may be implemented by general computing devices and centralized in a single computing device or distributed in a network consisting of multiple computing devices. Optionally, the modules or steps may be implemented by program codes executable by the computing devices, so that they may be stored in storage devices and executed by the computing device. In addition, in some cases, the steps as illustrated or described may be performed according to a sequence different from the sequence herein, or they may be realized by being respectively made into individual integrated circuit modules or a plurality of modules or steps may be made into a single integrated circuit module. By doing so, the present invention is not limited to any specific combination of hardware and software.

The above are only preferred embodiments of the present invention and should not be used to limit the present invention. For those skilled in the art, the present invention may have various modifications and chances. Any modifications, equivalent replacements, improvements and the like within the spirit and principle of the prevention shall fall within the scope of protection of the present invention.

What is claimed is:

1. A data cut-over method, comprising:
    obtaining a model mapping relationship between a source Operation Maintenance Module (OMM) and a target OMM of different system versions;

obtaining a base station which is designated by a user to be cut over to the target OMM and data associated with the base station that needs to be modified during the data cut-over designated by the user, and generating a data cut-over plan file;

exporting a source OMM data file from the source OMM;

exporting a target OMM data file from the target OMM;

generating an interface data file according to the model mapping relationship, the source OMM data file, the target OMM data file and the data cut-over plan file; and importing the interface data file into the target OMM.

2. The method according to claim 1, wherein the data associated with the base station that needs to be modified during the data cut-over designated by the user includes at least one of the followings:

a base station identifier (ID), a base station alias, a base station port and a Base Station Controller (BSC) port.

3. The method according to claim 2, wherein the mapping relationship, the source OMM data file, the target OMM data file, the data cut-over plan file and the interface data file are described in Excel format or Extensible Markup Language (XML) format.

4. The method according to claim 1, wherein generating an interface data file according to the model mapping relationship, the source OMM data file, the target OMM data file and the data cut-over plan file includes:

according to the model mapping relationship, determining whether there is a corresponding relationship between an MOC and associated source MOC attributes of the source OMM and an MOC and associated target MOC attributes of the target OMM;

if the MOC and the source MOC attributes of the source OMM correspond to the MOC and the target MOC attributes of the target OMM, adapting the MOC and the source MOC attributes of the source OMM to be the MOC and the target MOC attributes of the target OMM according to the model mapping relationship and storing the MOC and the MOC target attributes in an interface data file;

if the MOC and the source MOC attributes of the source OMM do not correspond to the MOC and the target MOC attributes of the target OMM, discarding the MOC and the source MOC attributes that exist only in the source OMM; and if the MOC and the source MOC attributes of the source OMM do not correspond to the MOC and the target MOC attributes of the target OMM, storing default values of the MOC and the target MOC attributes that exist only in the target OMM in the interface data file.

5. The method according to claim 4, wherein the mapping relationship, the source OMM data file, the target OMM data file, the data cut-over plan file and the interface data file are described in Excel format or Extensible Markup Language (XML) format.

6. The method according to claim 1, wherein after generating a data cut-over plan file, the method further including:

performing validity inspection for the data cut-over plan file and returning error information if the inspection result is invalid.

7. The method according to claim 6, wherein the mapping relationship, the source OMM data file, the target OMM data file, the data cut-over plan file and the interface data file are described in Excel format or Extensible Markup Language (XML) format.

8. The method according to claim 1, wherein the mapping relationship, the source OMM data file, the target OMM data file, the data cut-over plan file and the interface data file are described in Excel format or Extensible Markup Language (XML) format.

9. A data cut-over apparatus, comprising:

a processor, memory, and one or more program units stored on the memory, wherein the program units are configured to be executed by the processor and comprises:

a first obtaining module, configured to obtain a model mapping relationship between a source OMM and a target OMM of different system versions;

a second obtaining module, configured to obtain a base station which is designated by a user to be cut over to the target OMM and data associated with the base station that needs to be modified during the data cut-over designated by the user;

a first generating module, configured to generate a data cut-over plan file;

a first exporting module, configured to export a source OMM data file from the source OMM;

a second exporting module, configured to export a target OMM data file from the target OMM;

a second generating module, configured to generate an interface data file according to the model mapping relationship, the source OMM data file, the target OMM data file and the data cut-over plan file; and an importing module, configured to import the interface data file into the target OMM.

10. The apparatus according to claim 9, wherein the second generating module further includes:

a determining module, configured to, according to the model mapping relationship, determine whether there is a corresponding relationship between an MOC and associated source MOC attributes of the source OMM and an MOC and associated target MOC attributes of the target OMM;

a first storing module, configured to, if the MOC and the source MOC attributes of the source OMM correspond to the MOC and the target MOC attributes of the target OMM, adapt the MOC and the source MOC attributes of the source OMM to be the MOC and the target MOC attributes of the target OMM according to the model mapping relationship and store the MOC and the MOC target attributes in an interface data file;

a processing module configured to, if the MOC and the source MOC attributes of the source OMM do not correspond to the MOC and the target MOC attributes of the target OMM, discard the MOC and the source MOC attributes that exist only in the source OMM;

a second storing module configured to, if the MOC and the source MOC attributes of the source OMM do not correspond to the MOC and the target MOC attributes of the target OMM, store default values of the MOC and the target MOC attributes that exist only in the target OMM in the interface data file.

11. The apparatus according to claim 10, wherein the mapping relationship, the source OMM data file, the target OMM data file, the data cut-over plan file and the interface data file are described in Excel format or XML format.

12. The apparatus according to claim 9, wherein the apparatus further includes: a validity inspecting module configured to perform validity inspection for the data cut-over plan file.

13. The apparatus according to claim 12, wherein the mapping relationship, the source OMM data file, the target OMM data file, the data cut-over plan file and the interface data file are described in Excel format or XML format.

14. The apparatus according to claim 9, wherein the mapping relationship, the source OMM data file, the target OMM data file, the data cut-over plan file and the interface data file are described in Excel format or XML format.

* * * * *